(12) United States Patent
McDonald (10) Patent No.: US 10,007,911 B2
(45) Date of Patent: *Jun. 26, 2018

(54) METHODS FOR RAPIDLY PROVISIONING APPLICATION FUNCTIONALITY TO A MOBILE COMMUNICATION DEVICE

(71) Applicant: American Express Travel Related Services Company, Inc., New York, NY (US)

(72) Inventor: John G. McDonald, Eugene, OR (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/165,659

(22) Filed: May 26, 2016

(65) Prior Publication Data

US 2016/0267477 A1  Sep. 15, 2016

Related U.S. Application Data

(63) Continuation of application No. 14/177,014, filed on Feb. 10, 2014, now Pat. No. 9,384,485.

(Continued)

(51) Int. Cl.
*H04W 12/04* (2009.01)
*G06Q 20/38* (2012.01)
(Continued)

(52) U.S. Cl.
CPC ..... *G06Q 20/3829* (2013.01); *G06Q 20/3226* (2013.01); *G06Q 20/401* (2013.01);
(Continued)

(58) Field of Classification Search
None
See application file for complete search history.

(56) References Cited

U.S. PATENT DOCUMENTS 7,447,494 B2    11/2008  Law et al.
8,352,749 B2 *  1/2013  von Behren ....... G06Q 20/3552
                                                            235/492
(Continued)

OTHER PUBLICATIONS

Office Action dated Apr. 10, 2015 in U.S. Appl. No. 14/180,153.
(Continued)

*Primary Examiner* — John W Hayes
*Assistant Examiner* — Jason B Fenstermacher
(74) *Attorney, Agent, or Firm* — Snell & Wilmer L.L.P.

(57) ABSTRACT

Systems and methods for rapidly provisioning functionality to one or more mobile communication devices are disclosed. The method may comprise generating, prior to a request for the functionality, a globally unique identifier ("GUID") encryption key, wherein the GUID comprises a unique identifier that may be associated with a transaction account customer, generating a value associated with the GUID, deriving, based on the value, a plurality of base encryption keys associated with the value, creating, a perso-script, wherein the perso-script comprises a file associated with data associated with a customer, and/or creating a proto-script, wherein the proto-script comprises the perso-script prepended by a script to rotate the plurality of base encryption keys.

20 Claims, 4 Drawing Sheets

Related U.S. Application Data (60) Provisional application No. 61/909,220, filed on Nov. 26, 2013.

(51) Int. Cl.
*H04L 29/06* (2006.01)
*H04W 12/02* (2009.01)
*G06Q 20/40* (2012.01)
*G06Q 20/32* (2012.01)

(52) U.S. Cl.
CPC ......... *H04L 63/0428* (2013.01); *H04W 12/02* (2013.01); *H04W 12/04* (2013.01)

(56) References Cited

U.S. PATENT DOCUMENTS

| | | | |
|---|---|---|---|
| 2006/0287004 A1 | 12/2006 | Fuqua | |
| 2008/0189550 A1* | 8/2008 | Roundtree | G06F 21/51 |
| | | | 713/176 |
| 2010/0291896 A1 | 11/2010 | Corda | |
| 2010/0291904 A1* | 11/2010 | Musfeldt | G06F 21/604 |
| | | | 455/414.1 |
| 2010/0303230 A1* | 12/2010 | Taveau | G06Q 20/02 |
| | | | 380/30 |
| 2012/0174189 A1* | 7/2012 | Lim | H04L 63/067 |
| | | | 726/3 |
| 2012/0204032 A1* | 8/2012 | Wilkins | H04L 9/006 |
| | | | 713/170 |
| 2013/0111546 A1* | 5/2013 | Gargiulo | H04L 9/32 |
| | | | 726/1 |
| 2014/0337236 A1* | 11/2014 | Wong | G06Q 20/363 |
| | | | 705/71 |
| 2015/0073996 A1* | 3/2015 | Makhotin | G06Q 20/02 |
| | | | 705/71 |
| 2015/0140960 A1* | 5/2015 | Powell | H04W 4/24 |
| | | | 455/406 |

OTHER PUBLICATIONS

Office Action dated Apr. 22, 2015 in U.S. Appl. No. 14/180,142.
Office Action dated Sep. 12, 2014 in U.S. Appl. No. 14/177,014.
Final Office Action dated Mar. 25, 2015 in U.S. Appl. No. 14/177,014.
Advisory Action dated Jun. 3, 2015 in U.S. Appl. No. 14/177,014.
Notice of Allowance dated Dec. 8, 2015 in U.S. Appl. No. 14/180,153.
Notice of Allowance dated Dec. 8, 2015 in U.S. Appl. No. 14/180,142.
Office Action dated Nov. 5, 2015 in U.S. Appl. No. 14/177,014.
Notice of Allowance dated Apr. 29, 2016 in U.S. Appl. No. 14/177,014.

\* cited by examiner

METHODS FOR RAPIDLY PROVISIONING APPLICATION FUNCTIONALITY TO A MOBILE COMMUNICATION DEVICE

CROSS REFERENCE TO RELATED APPLICATIONS

This application is a continuation of, claims priority to and the benefit of, U.S. Ser. No. 14/177,014 filed Feb. 10, 2014 and entitled "SYSTEMS AND METHODS FOR RAPIDLY PROVISIONING FUNCTIONALITY TO ONE OR MORE MOBILE COMMUNICATION DEVICES." The '014 application is a nonprovisional of, claims priority to and the benefit of, U.S. Ser. No. 61/909,220 filed on Nov. 26, 2013 and entitled "SYSTEMS AND METHODS FOR RAPIDLY PROVISIONING CONTACTLESS PAYMENT FUNCTIONALITY TO ONE OR MORE MOBILE COMMUNICATION DEVICES." Both of which are incorporated by reference herein in their entirety.

FIELD

The present disclosure generally relates to systems and methods for rapidly provisioning functionality to one or more mobile communication devices.

BACKGROUND

Mobile communication devices may facilitate application functionality, such as payment over a wireless communication network. For instance, a mobile communication device (e.g., cellular telephone, mobile telephone, a smart phone) may include software and/or hardware that supports or enables wireless communication (e.g., near field communication or "NFC") by the device with one or more wirelessly enabled point of sale terminals (POS terminals).

Conventionally, a backend system (e.g., a trusted service manager or "TSM") itself comprising hardware and/or software, may enable an application service provider (e.g., American Express) to distribute its application functionality, such as contactless payment software (and functionality, as described herein), over a proprietary telecommunications network (or "Telco") to a microcontroller (e.g., a Universal Integrated Circuit Card ("UICC") or microSD card) located within the mobile communication device. This integrated circuit may be more generally referred to as a "secure element" to denote, for example, that the circuit may store an encryption key and/or a set of encryption keys used to authenticate the mobile device to a Telco and/or an application service provider using the over the air (OTA) Telco services.

GlobalPlatform (GP) is the industry standard for securely communicating with Secure Elements during manufacturing (i.e., pre-issuance) and while the Secure Elements are in the mobile devices held by consumers (i.e., post-issuance). Additionally, GP provides security controls to protect the sensitive data and cryptographic keys held in the Secure Element.

GP offers a range of cryptographic key management methods to enable the issuer of the Secure Element, such as a Telco, and the associated Service Providers. These include both "push" and "pull" models. An example of the push model is where an application service provider may request that a particular Telco provide (or provision) a cryptographic key or keys (e.g., a symmetric key or keys) to a particular secure element in response, for example, to a request by the user of the mobile communication device for certain contactless payment software and/or functionality. In response, the Telco may follow GP to generate (e.g., randomly generate) and provide the key(s) to the secure element on the mobile communication device. The secure element may store the key(s). The Telco may also securely provide a copy of the key to the application service provider. Thus, the secure element and the application service provider may share the key(s); that is, each entity may share this key as a "shared secret." The mobile communication device may, in response to receipt of the shared secret, authenticate to the application service provider to receive the contactless payment software and/or functionality.

One aspect of GP is to have robust cryptographic key management. Hence, as part of this "push" process, it is conventionally necessary that the application service provider establish (or "rotate" to) a different cryptographic key(s), so that the Telco (which provided the original cryptographic key(s) to both the application service provider as well as to the secure element on the mobile device) is no longer able to decrypt communications between the application service provider and the mobile device. However, rotated keys are encrypted and provided to the secure element, under the key(s) provided by the Telco. Although a secure element may obtain rotated keys (that is, keys unknown to the Telco), it is conventionally possible for the Telco to decrypt the data packet containing the rotated keys during transmission to the secure element, because that packet is encrypted with the key(s) provided during the initial authentication stage by the Telco.

As the application service provider rotates to a new key set, it is also conventionally necessary that the application service provider collect and assemble the data necessary to enable its contactless payment functionality. This functionality may comprise the data necessary to complete a contactless payment transaction (e.g., a customer account number, a customer account payment limit, and the like). This collection of data may be referred to herein as "perso-data," which may be collected into a file, which may be referred to herein as a "perso-script." The perso-script may be generated in response to a request for such functionality and encrypted under session keys based on the rotated key(s). Hence, the perso-script may itself be at risk of decryption by the Telco.

GP also provides for a "pull" model, whereby the Secure Element generates a set of cryptographic keys and securely returns them to the Service Provider. This approach typically involves the use of public key cryptography and resolves the vulnerability of the Telco being able to expose the cryptographic keys (shared between the Secure Element and the Service Provider) or the sensitive data protected by those keys. However, even in the "pull" model the Service Provider may well want to rotate the keys held in the Secure Element so as to streamline cryptographic key management on the Service Provider's back end systems, e.g., deriving the keys held on the Secure Element from one or more master keys using Secure Element specific information.

A common challenge that both the "pull" and "push" methods face is that it is typically necessary that the application service provider generate the perso-script (including the rotated key(s) in response to receipt of a real-time request for contactless payment functionality. This means that the application service provider may have to maintain significant data processing resources to accommodate millions or tens of millions of requests occurring in real-time for contactless payment functionality. This may impose a significant burden on the processing resources (e.g., hardware) required to generate and encrypt each perso-script, and may in fact require that an application service provider maintain a large number of such data processing resources (including hardware security modules or "HSMs").

SUMMARY

Systems and methods for rapidly provisioning functionality to one or more mobile communication devices are disclosed. The method may comprise generating, prior to a request for the functionality, a globally unique identifier ("GUID") master encryption key, wherein the GUID comprises a unique identifier that may be associated with a transaction account customer, generating GUID values, deriving, based on the GUID value, a plurality of base encryption keys associated with the GUID value, creating, a perso-script, wherein the perso-script comprises a file associated with data associated with a customer, and/or creating a proto-script, wherein the perso-script comprises the proto-script prepended by a script to rotate the plurality of base encryption keys.

The base encryption keys may comprise ENC, MAC and DEK base keys. The functionality may comprise contactless payment functionality. The perso-data may comprise an alias account number, and/or the alias account number may comprise a unique number associated with a transaction account number. This may further comprise deriving the plurality of base encryption keys based on the GUID master encryption key. The method may further comprise storing the proto-script. The proto-script may be stored with reference to its GUID. The proto-script may be stored with reference to the GUID encryption key.

BRIEF DESCRIPTION OF THE DRAWINGS

The features and advantages of the present disclosure will become more apparent from the detailed description set forth below when taken in conjunction with the drawings. The attached figures are illustrative of the systems and methods described herein.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A system, method and/or computer program product for rapidly provisioning application functionality, e.g., contactless payment functionality, to one or more mobile communication devices is described. A variety of terms and acronyms, as used herein, are described and/or defined above with respect to the background portion of this disclosure as well as, in certain instances, below.

As described herein, a variety of encryption techniques or methods may be performed by way of any of the techniques now available in the art or which may become available—e.g., AES, Twofish, RSA, El Gamal, Schorr signature, DSA, PGP, PKI, GPG (GnuPG) ECC, and symmetric and asymmetric cryptosystems. Some of these are described below.

As used herein, "perso-data" may comprise any data associated with an application service provider customer, such as a transaction account code, a transaction account spending limit, an alias account code (e.g., a unique code associated with a transaction account code that is not the transaction account number) and the like. Likewise, as used herein, a "perso-script" may comprise a collection of perso-data, such as a file containing perso-data.

To minimize the amount of real-time processing needed to support a provisioning request, the method may comprise creating a globally unique identifier ("GUID"), which can be a binary value that can be sequential or randomly generated and a multiple of the size of the block cipher being used, one or more symmetric master cryptographic keys to derive GUID specific master keys, where the derived keys can either be created on the fly or generated and securely stored. The GUID specific master keys are used, as per GP, to create GUID specific base keys, either directly or by first creating a GUID specific base master key, which are used (as per GP) to create GUID specific session keys. The GUID specific session keys are used to build the majority (e.g., approximately 95%) of the perso script, called the "proto-script." The proto-scripts can be stored on the back-end systems of the entity looking to provide the application functionality, whether a Telco, a Service Provider, etc. During real-time activities, whether following the GP "push" or "pull" method, the remaining steps for the back-end system is to select an available GUID and associate it with the details of the given mobile device and Secure Element, such as GP Sub-Security Domain identifiers, etc. The back-end systems then use the just received/created keys (that correspond to the keys on the Secure Element) to create the corresponding session keys (as per GP) and make a portion of script that rotates the current keys on the Secure Element to the new GUID specific base keys. This key rotation script is prepended to the proto-script to yield the final perso-script that can be sent to the Secure Element for processing. Note that this entire approach can also work in a "batch" mode, whereby the keys could be pushed or pulled from the Secure Element (as per GP) during the manufacturing process, with the results given to the Application Provider for finalized script building. The finalized scripts would then be sent to the Secure Element during the real-time provisioning request.

Figure 1:
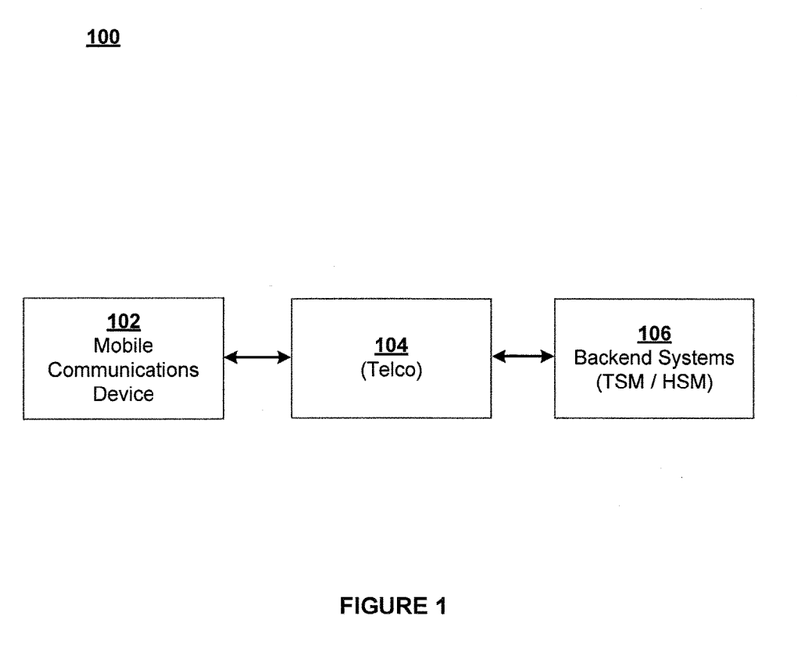
FIG. 1 illustrates, in accordance with various embodiments, a system for rapidly provisioning contactless payment functionality to one or more mobile devices.

With reference to FIG. 1, a system 100 for rapidly provisioning application functionality, e.g., contactless payment functionality, to one or more mobile communication devices is shown. The system 100 may comprise one or more mobile communication devices 102, a Telco 104, and/or one or more backend systems 106. The one or more backend systems 106 may belong to (i.e., be owned by an application service provider ("ASP"), such as American Express Travel Related Services Company).

The one or more backend systems 106 may, for example, comprise an application service provider ('ASP") comprising one or more backend systems 106. The one or more backend systems 106 may comprise a variety of systems, such as a "three tiered" web architecture including one or more processors, computer-based systems, servers, storage elements, databases, and the like. In various embodiments, the backend systems 106 may comprise one or more trusted service managers ("TSMs") and/or one or more hardware security modules ("HSMs"), each comprising a variety of hardware and/or software. For ease of reference, any of the backend systems 106 referred to herein may collectively and/or individually be simply referred to as a TSM.

Figure 2:
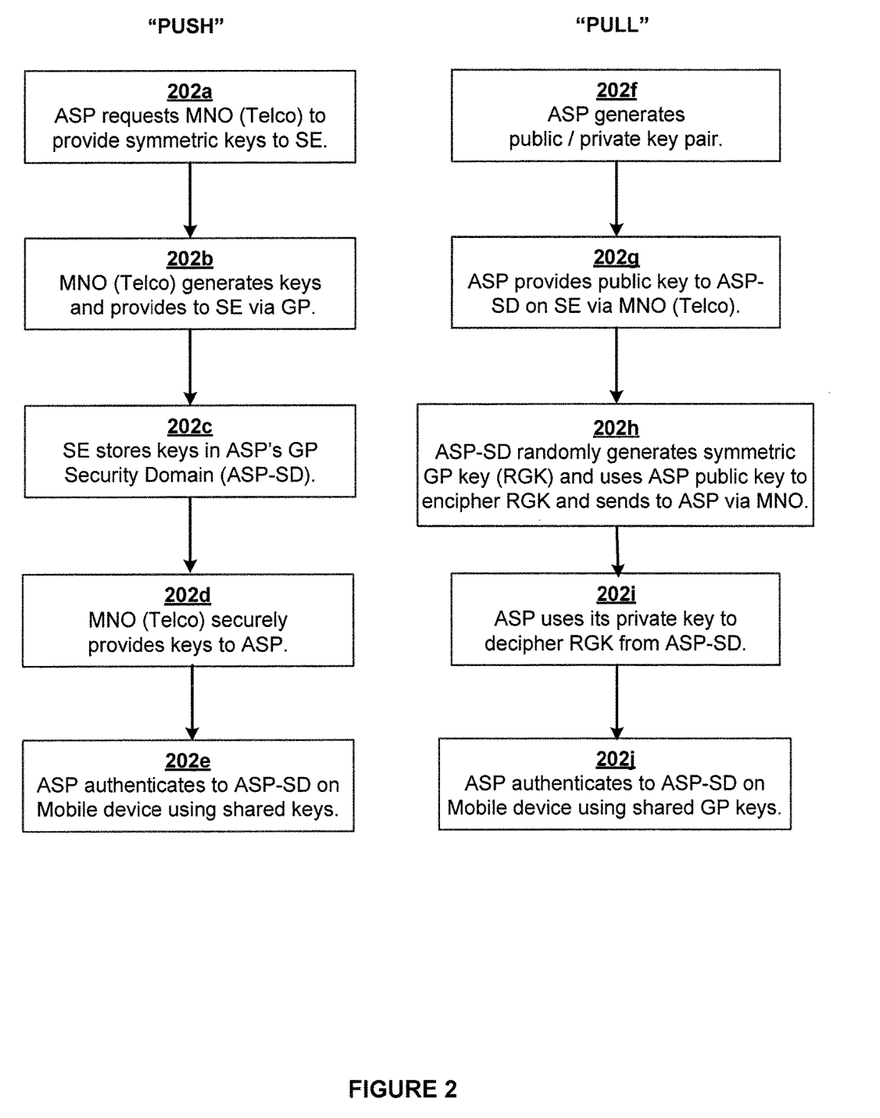
FIG. 2 illustrates, in accordance with various embodiments, both "push" and "pull" methods of GlobalPlatform.

As described above, as those of skill in the art will appreciate and with regard to FIG. 2, GlobalPlatform provides for several encryption models, such as "push" and "pull" models. With respect to the "push" model, an application service provider may request that a particular Telco 104 provide (or provision) a cryptographic key or keys (e.g., a symmetric key or keys) to a particular secure element in response, for example, to a request by the user of the mobile communication device 102 for certain contactless (e.g., payment) software and/or functionality (step 202a). In response, the Telco 104 may follow the GP push model to generate (e.g., randomly generate) and provide the key(s) to the secure element (which may itself comprise a secure domain or sub-domain associated with the ASP) on the mobile communication device 102 (step 202b). The secure element may store the key(s) (202c), such as within the ASP's GP security domain. The Telco 104 may also securely provide a copy of the key to the application service provider (step 202d). Thus, the secure element and the application service provider may share the key(s); that is, each entity may share this key as a "shared secret." The mobile communication device 102 (e.g., the mobile communication device's security domain) may, in response to receipt of the shared secret, authenticate to the application service provider in preparation to receive the contactless payment software and/or functionality (step 202e).

With continuing reference to FIG. 2, an example of a "pull" model of GlobalPlatform is shown. In general (although the pull model may be implemented variously), the ASP may generate a public/private key pair (step 202f). Thereupon, the ASP may provide the Telco 104, the public key generated at step 202f, whereupon the Telco 104 will, via GP, send the ASP public key to the mobile communication device 102—namely, the ASP GP security domain (ASP-SD) on the mobile communication device's secure element (step 202g). The ASP security domain on the mobile communication device 102 may thereupon randomly generate a symmetric key (i.e., a randomly generated key or "RGK") and utilize the ASP public key to encrypt the RGK (step 202h). The public key may be transmitted to the ASP via the Telco 104. The ASP may further utilize the private key to decrypt the RGK (step 202i). In this manner, the ASP may authenticate to the security domain on the mobile communication device 102 using the shared keys (ENC, MAC and DEK) derived (per GP) from the RGK.

This GP "pull" approach can involve the use of public key cryptography to resolves the vulnerability of the Telco being able to expose the cryptographic keys (shared between the Secure Element and the Service Provider) or the sensitive data protected by those keys (the vulnerability of the "push" method). However, even in the "pull" model the Service Provider or ASP may well want to rotate the keys held in the Secure Element so as to streamline cryptographic key management on the Service Provider's back end systems, e.g., deriving the keys held on the Secure Element from one or more master keys using Secure Element specific information.

Figure 3:
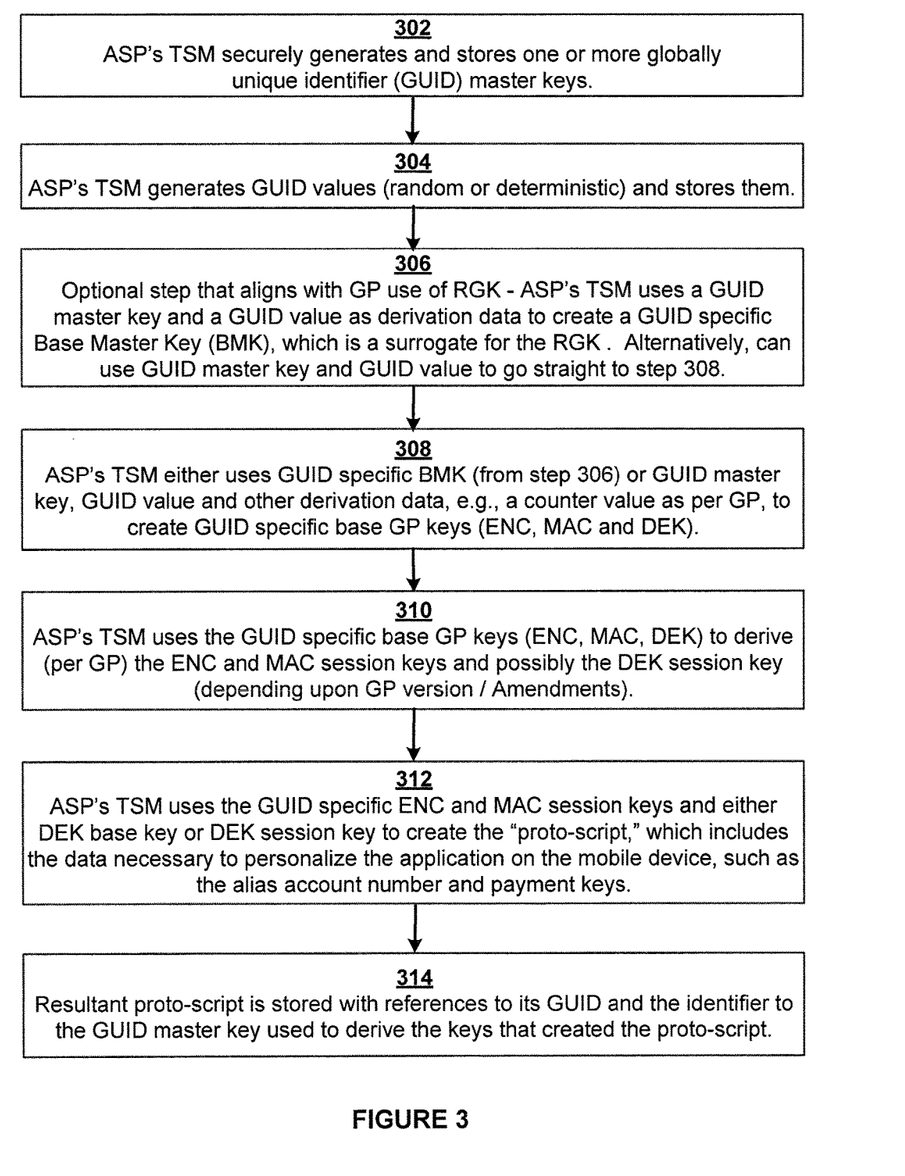
FIG. 3 illustrates, in accordance with various embodiments, a process for rapidly constructing functionality prior to a request for such functionality.

In either instance ("push" or "pull"), and with reference to FIG. 3, the application service provider (more particularly, the ASP's trusted service manager or "TSM") may, in various embodiments, securely generate and store one or more globally unique identifier ("GUID") master keys (step 302). The TSM may (e.g., subsequently) generate GUID values (i.e., random or deterministic values based upon any data, including perso-data and encrypted with the GUID master keys) and/or store these GUID values (step 304). Note that the GUID acts as a surrogate for the Secure Element specific information.

Optionally, the ASP's TSM may use a GUID master key and a GUID value as derivation data to create a GUID specific Base Master Key ("BMK"), which may represent a "surrogate" to the RGK (step 306). In the alternative, however, step 304 may be immediately followed by step 308. Both options are available.

With respect to step 308, the ASP's TSM may use the GUID specific BMK (generated at step 306), the GUID master key, the GUID value, and/or any other data suitable for derivation to create GUID specific base keys, such as an ENC key, a MAC key, and/or a DEC key (step 308).

As per GlobalPlatform, an ENC key may comprise an encryption key that is used to derive ENC session keys, and ENC session keys may protect sensitive data, such as data in commands to the chip. A MAC base key may comprise a message authentication code key that is used to derive MAC session keys. MAC session keys provide integrity of commands and data, as well as sender authentication. A DEK key may comprise a data encryption key (static) that protects sensitive data, such as other cryptographic keys.

Further, as per GlobalPlatform and as those of ordinary skill will appreciate, the ASP's TSM may use the GUID specific base keys (again, the ENC, MAK, DEC keys) to derive the ENC and MAC session keys and/or perhaps the DEK session key (depending upon the version of GP being used and/or the amendment to GP being used) (step 310).

In various embodiments, the ASP's TSM may use the GUID specific ENC and MAC session keys (and in some instances the DEK base key or DEK session key) to create a "proto-script." As used herein, a proto-script may comprise any data necessary to personalize an application (e.g., requested functionality) to a mobile communication device 102. Such data may include an alias account code (e.g., a unique number linked to a transaction account code) and/or payment keys (step 312). The resultant proto-script may be stored with reference(s) to its GUID and/or the identifier to the GUID master key that was used to derive the keys that created the proto-script, as described above (step 314).

Figure 4:
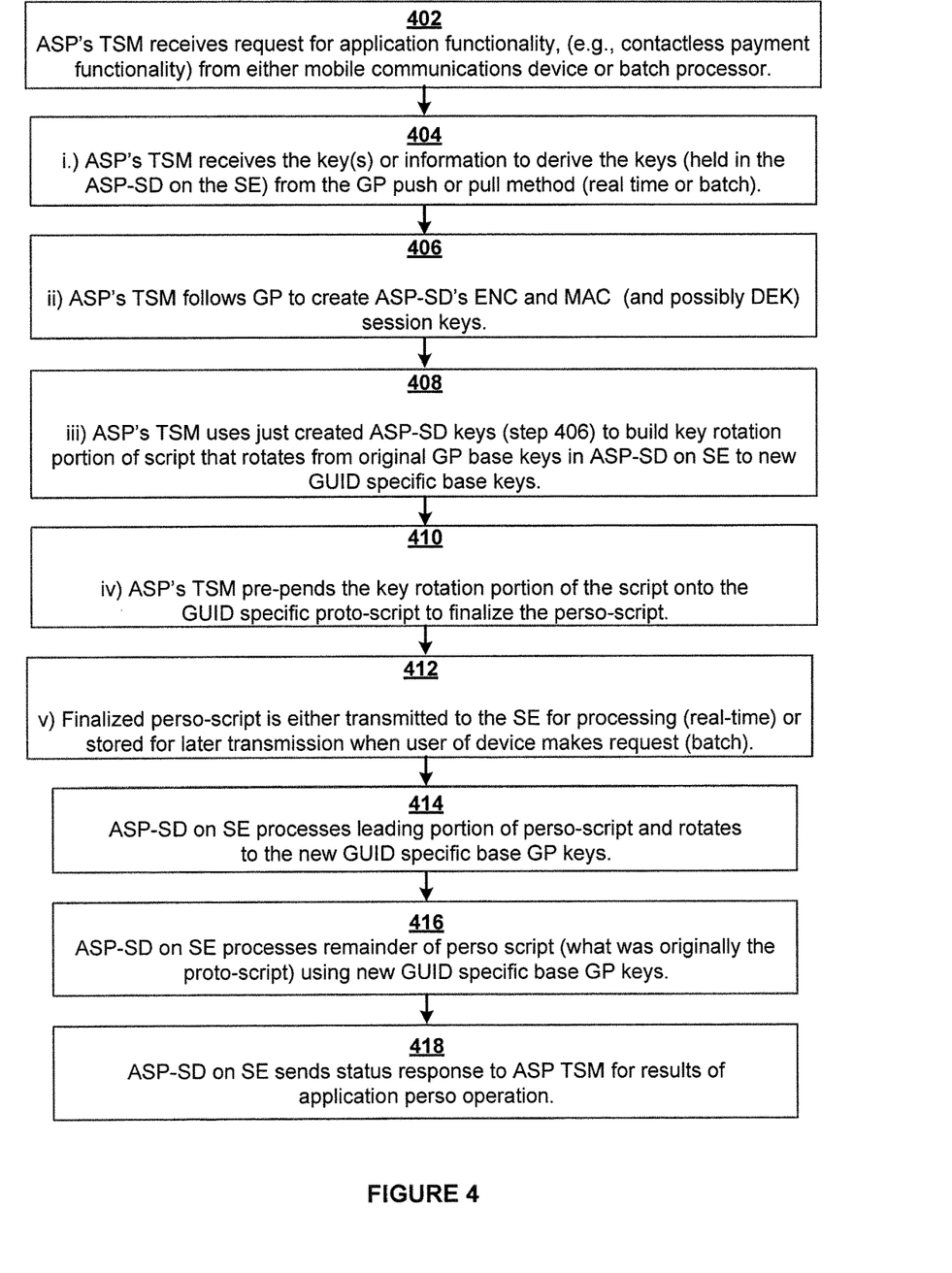
FIG. 4 illustrates, in accordance with various embodiments, a process for rapidly provisioning functionality in response to a request for such functionality.

With reference to FIG. 4, a process for rapidly provisioning functionality (e.g., contactless payment functionality) is shown. In various embodiments, the ASP's TSM may receive a request for application (e.g., contactless payment) functionality—however, any type of functionality may be provisioning as described herein (402). This request may be received from mobile communication device 102 and/or a batch processor. In response to receiving such a request, the ASP's TSM may receive the key(s) or information to derive the keys that are stored in the secure element of the mobile device 102 via the push or pull method (step 404). The ASP's TSM may create the ASP-SD ENC, MAC and DEK to create the ENC and MAC (and possibly DEK) session keys, as described above (step 406). The ASP's TSM may utilize these newly created ENC and MAC session keys, along with either the DEK or DEK session key, to build a "key rotation portion" of the perso-script that may be used to "rotate" from (or exchanges for) the original base keys stored on the secure element in the ASP-SD of the mobile device 102 to new GUID specific base keys (step 408). Continuing, the ASP's TSM may pre-pend the key rotation script to the GUID specific proto-script to finalize the perso-script (step 410). The finalized perso-script may either be transmitted to the secure element on the mobile device 102 for processing (real-time) or stored for later transmission when a user of a mobile communication device 102 makes a request (step 412).

In various embodiments, the secure element may process the leading portion of the perso-script to rotate to the new GUID specific base keys (step 414). The secure element may further process the remainder of the perso-script (what was originally the proto-script) using the new GUID specific base keys (step 416). The secure element may further still transmit a status response to the ASP TSM for results of the application perso operation (step 418).

Therefore, although previous systems typically prevented creation of a perso-script until a request for payment functionality was received, the systems and methods described herein permit the creation of one or more proto-scripts far in advance of any application request. This feature may, in turn, dramatically reduce the workload and realtime processing required by one or more TSMs/HSMs, as each proto-script need not be created on the fly in response to a request for application functionality, but during, for example, periods of decreased processing requirements, such as during nights and weekends. Accordingly, the number of TSMs/HSMs required by an application service provider to accommodate millions or tens of millions of real-time requests for functionality may be dramatically reduced, saving the provider expense and maintenance. Thus, functionality may be "rapidly" provisioned (in comparison to conventional systems), in that the proto-script for generic customers or specific to a customer may be constructed ahead of any request for such functionality (e.g., immediately before, within seconds before, within minutes before, within hours before, within days before, within months before, within years before).

The phrases consumer, customer, user, account holder, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, an transaction account user, an account affiliate, a child account user, a subsidiary account user, a beneficiary of an account, a custodian of an account, and/or any other person or entity affiliated or associated with a transaction account. In addition, as used herein, a user may comprise, in various embodiments, any person who interacts and/or interfaces with a computer system (e.g., an organizational and/or an employer computer system).

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

As used herein, a network includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE, PALM PILOT, BLACKBERRY), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing, which is hereby incorporated by reference in its entirety.

A database may comprise any type of hardware and/or software (e.g., a computer server) configured or configurable to store data and/or host a database. For example, database 106 may comprise a server appliance running a suitable server operating system (e.g., IIS) and having database software (e.g., SQL Server 2008, an Oracle database, and the like), stored thereon. Database 106 may, in various embodiments, compress and/or analyze data, as described herein. Similarly, in various embodiments, database may be coupled to a system for analyzing and/or compressing data, as described herein.

Referring broadly to the attached figures, the process flows, logical representations, and/or screen shots depicted are merely embodiments and are not intended to limit the scope of the disclosure. For example, the steps recited in any of the method or process descriptions may be executed in any order and may, in various embodiments, apply to the systems as depicted. It will be appreciated that the following description makes appropriate references not only to the steps depicted in the figures but also to the various system components and/or logical representations as described above.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, facebook, twitter, MMS, data communication over a financial acquirer network, and/or other type of communication technology. In various embodiments, a channel may be hosted or provided by a data partner.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user data, file system data, client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (e.g., MySQL) (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other sub sets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit or monitor only certain individuals, levels of employees, companies, or other entities accessing data sets, or to permit or monitor access to specific data sets based on the transaction, merchant, issuer, user or the like. Furthermore, the security information may restrict, permit, and/or monitor only certain actions such as accessing, modifying, and/or deleting data sets. In one example, the data set annotation may indicate or track that only the data set owner or the user are permitted to delete a data set, various identified users may be permitted to access the data set for reading, and others are altogether excluded from accessing the data set. However, other access restriction or monitoring may also be used which may allow various entities to access a data set with various permission levels as appropriate, and/or which monitoring may also be used to track various entities (e.g., users or systems) accessing a data set with various permission levels. Thus, in various embodiments, tracking information may enable a system administrator to inquire into one or more user activities, which inquiry may permit the system administrator to adjust one or more access controls, modify one or more user groups or transaction clusters, and the like.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

A firewall may include any hardware and/or software suitably configured to protect CMS components and/or enterprise computing resources from users of other networks. Further, a firewall may be configured to limit or restrict access to various systems and components behind the firewall for web clients connecting through a web server.

Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular or mobile telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the AMERICAN EXPRESS, VISANET and the VERIPHONE networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell or mobile phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, ISO 14443, Near Field Communication Interface and Protocol-1 (NFCIP-1); ISO/IEC 21481/ECMA-352, Near Field Communication Interface and Protocol-2 (NFCIP-2); and EMV 4.2.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The terms "payment vehicle," "financial transaction instrument," "transaction instrument" and/or the plural form of these terms may be used interchangeably throughout to refer to a financial instrument.

Phrases and terms similar to "internal data" or "persodata" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include, for example, consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method comprising:
    creating, by a provisioning computer-based system and using a GUID (globally unique identifier) specific base master key and prior to a request for provisioning application functionality, a GUID specific base key;
    creating, by the computer-based system and using the GUID specific base master key, a GUID specific base session key;
    creating, by the computer-based system and using the GUID specific base session key and prior to the request for provisioning application functionality, a proto-script which is a first portion of a perso-script,
    creating, by the computer-based system and after the request for provisioning application functionality, a second portion of the perso-script, wherein the second portion is prepended to the proto-script to rotate from one or more base encryption keys stored on a secure element to the GUID specific base key, wherein the perso-script comprises the first portion and the second portion;
    sending, by the computer-based system and after the request for provisioning application functionality, the perso-script to a secure element associated with the transaction account customer for processing, which executes the prepended portion of the perso-script to rotate to GUID specific base key and then completes the perso-script that is protected under the GUID specific base session key to complete the perso-script.

2. The method of claim 1, further comprising deriving, by the computer-based system and based on a GUID value and prior to the request for provisioning application functionality, a GUID specific base master encryption key associated with the GUID value.

3. The method of claim 2, wherein the GUID specific base master encryption key is based on the GUID value and a GUID master encryption key.

4. The method of claim 1, further comprising deriving, by the computer-based system and using a symmetric master cryptographic key and prior to the request for provisioning application functionality, the GUID specific base master key.

5. The method of claim 1, wherein the second portion of the perso-script comprises a file having perso-data associated with details of a mobile device and the secure element associated with the transaction account customer.

6. The method of claim 5, wherein the perso-data comprises an alias account number, the alias account number comprising a unique number associated with a transaction account number.

7. The method of claim 1, wherein the one or more base encryption keys comprise ENC and MAC base keys.

8. The method of claim 1, further comprising generating, by the computer-based system and prior to the request for provisioning application functionality, a GUID master encryption key.

9. The method of claim 1, wherein the GUID comprises a unique identifier that is associated with a transaction account customer.

10. The method of claim 1, further comprising storing, by the computer-based system, the proto-script.

11. The method of claim 1, wherein the proto-script is stored with reference to its GUID.

12. The method of claim 1, wherein the proto-script is stored with reference to the GUID encryption key.

13. The method of claim 1, wherein the sending occurs in at least one of batch processing or real-time.

14. The method of claim 1, wherein the application functionality includes contactless payment functionality.

15. A method comprising:
    transmitting, by a mobile communication device and to an application service provider system, a request for provisioning application functionality;
    wherein a GUID specific base key is created by the application service provider system and using a GUID (globally unique identifier) specific base master key and prior to the request for provisioning the application functionality,
    wherein a GUID specific base session key is created by the application service provider system and using the GUID specific base master key,
    wherein a proto-script is created, wherein the proto-script is a first portion of a perso-script, by application service provider system and using the GUID specific base session key and prior to the request for provisioning the application functionality,
    wherein a second portion of the perso-script is created and prepended to the proto-script to rotate from one or more base encryption keys stored on a secure element to the GUID specific base key, by the application service provider system and after the request for provisioning the application functionality, wherein the perso-script comprises the first portion and the second portion,
    wherein the perso-script is sent to a secure element of the mobile communication device associated with the transaction account customer for processing, by the application service provider system and after the request for provisioning the application functionality,
    receiving, by the mobile communication device, the perso-script,
    executing, by the mobile communication device, the prepended portion of the perso-script to rotate to GUID specific base key;
    completing, by the mobile communication device, the perso-script that is protected under the GUID specific base session key to create a completed perso-script;
    transmitting, by the mobile communication device and to the application service provider system, the completed perso-script; and receiving, by the mobile communication device and from the application service provider system, the application functionality.

16. The method of claim 15, wherein the perso-script comprises a file that includes customer information and is prepended by a key rotation portion.

17. The method of claim 15, wherein a GUID specific base master encryption key associated with the GUID value is derived, by the application service provider system and based on a GUID value and prior to the request for provisioning the application functionality.

18. The method of claim 17, wherein the GUID specific base master encryption key is based on the GUID value and a GUID master encryption key.

19. The method of claim 15, wherein the GUID specific base master key is derived, by the application service provider system and using a symmetric master cryptographic key and prior to the request for the provisioning application functionality.

20. A method comprising:
   receiving, by a proprietary telecommunications company ("Telco") computer-based system and prior to a request for provisioning functionality, a GUID (globally unique identifier) encryption key from an application service provider system;
   wherein a GUID specific base key is created by the application service provider system and using a GUID specific base master key and prior to the request for provisioning the application functionality,
   wherein a GUID specific base session key is created by the application service provider system and using the GUID specific base master key,
   wherein a proto-script is created that forms a majority of a perso-script, by application service provider system and using the GUID specific base session key and prior to the request for provisioning the application functionality,
   wherein an additional portion is prepended to the proto-script to rotate from one or more base encryption keys stored on a secure element to the GUID specific base key to create the perso-script, by the application service provider system and after the request for provisioning the application functionality,
   wherein the perso-script is sent to the Telco computer-based system, by the application service provider system and after the request for provisioning the application functionality, receiving, by the Telco computer-based system and from the application service provider system, the perso-script; and
   transmitting, by the Telco computer-based system, the perso-script to a secure element of the mobile communication device associated with the transaction account customer for processing.

* * * * *